Dec. 24, 1935. G. O. HARM ET AL Re. 19,795

DUMPING RECEPTACLE

Original Filed Feb. 5, 1932 3 Sheets-Sheet 1

Inventors
GEORGE O. HARM.
ROBERT R. McBRIDE.

By Hauxgood & Van Horn
Their Attorneys

Dec. 24, 1935. G. O. HARM ET AL Re. 19,795
DUMPING RECEPTACLE
Original Filed Feb. 5, 1932 3 Sheets-Sheet 2
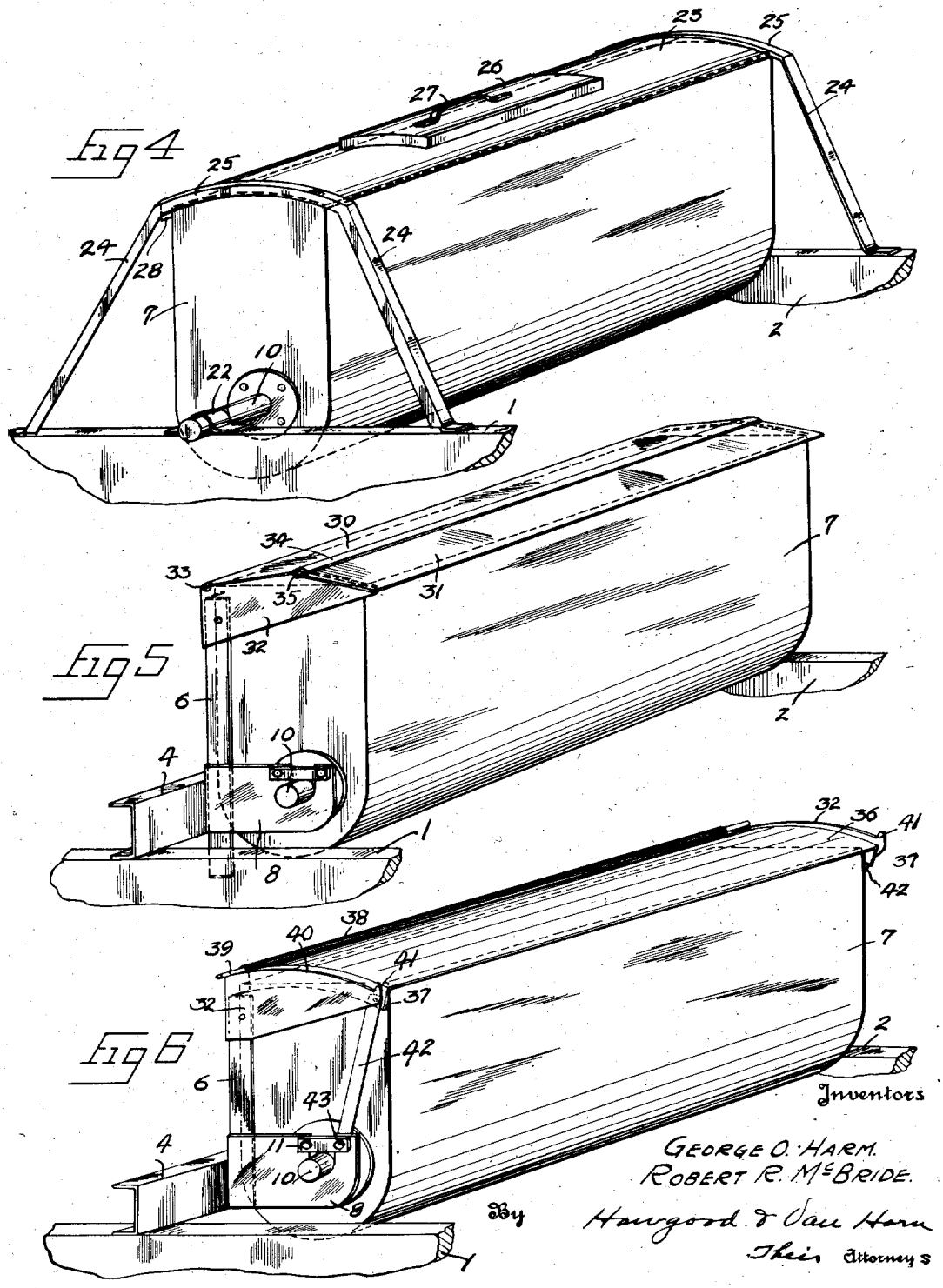
Inventors
GEORGE O. HARM.
ROBERT R. McBRIDE.
By Hargood & Van Horn
Their Attorneys Dec. 24, 1935. G. O. HARM ET AL Re. 19,795
DUMPING RECEPTACLE
Original Filed Feb. 5, 1932 3 Sheets-Sheet 3
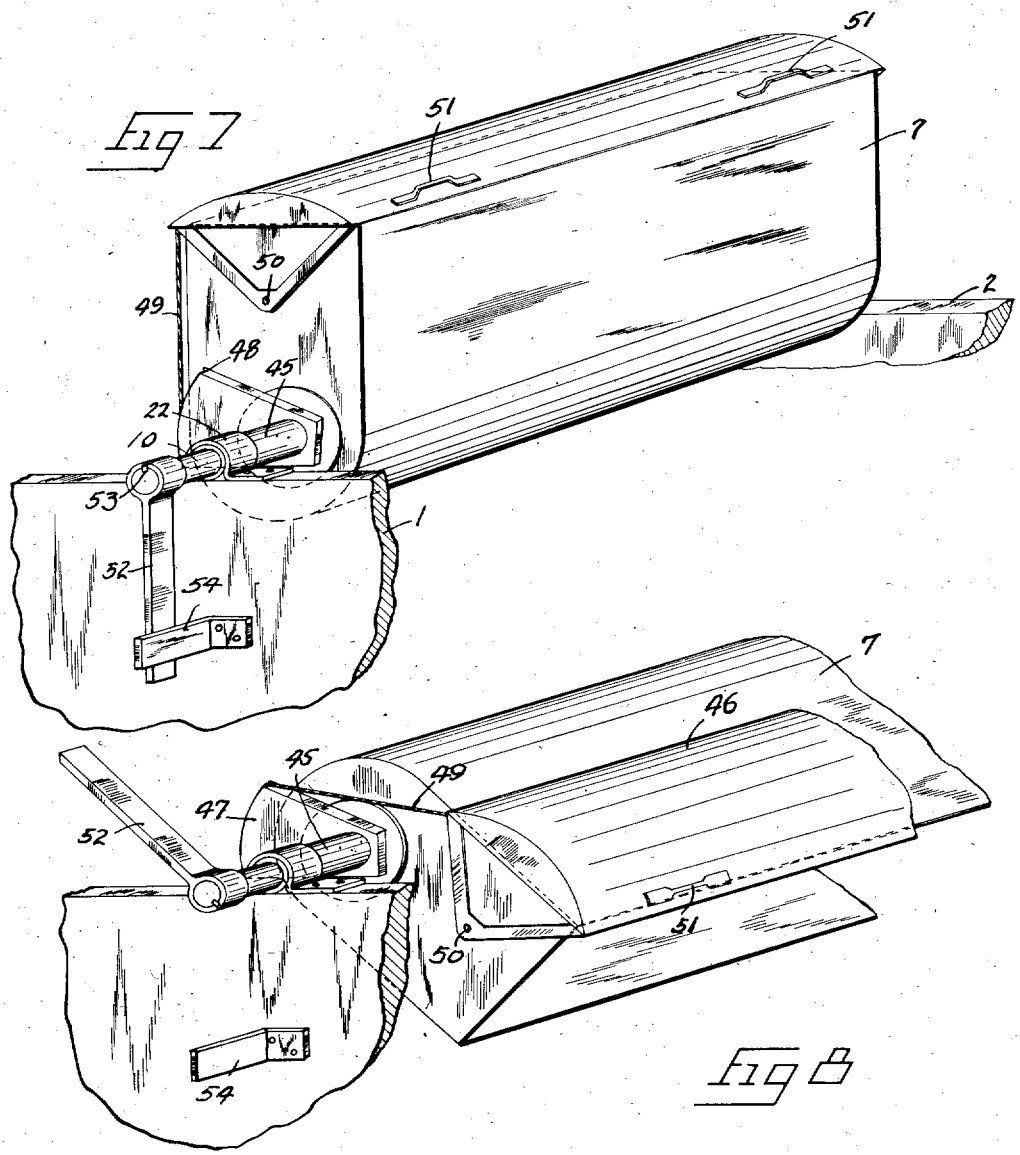
Inventors
GEORGE O. HARM.
ROBERT R. McBRIDE.
By Hayward & Van Horn
Their Attorneys Reissued Dec. 24, 1935 Re. 19,795

UNITED STATES PATENT OFFICE 19,795

DUMPING RECEPTACLE

George O. Harm, Warren, Ohio, and Robert R. McBride, Franklin, Pa., assignors to The Stevens Metal Products Company, Niles, Ohio, a corporation of Ohio Original No. 1,924,927, dated August 29, 1933, Serial No. 591,212, February 5, 1932. Application for reissue August 24, 1935, Serial No. 37,783

14 Claims. (Cl. 298—8)

Our invention relates to dumping receptacles such as are used in connection with dumping trucks or other vehicles for conveying and delivering batches of material. The invention relates more particularly to means in connection with a dumping vehicle body for separately receiving a charge of material and automatically dumping the same when the vehicle body is tilted to dump the material from the body.

Our invention is particularly well adapted for use in connection with a dumping truck for separately storing the mixture of fine and coarse aggregates and the cement for a concrete batch, and for discharging the cement into or with the aggregates as they are being discharged from the truck body.

Heretofore, mixer charging dump trucks have been provided with receptacles for storing the cement separately from the sand and gravel or other aggregates. In all such devices of which we are aware, the receptacles are not released or allowed to dump their charges into the compartments of the truck body even when the body is tilted, until certain locking or latching devices are manually operated to release the receptacles. In some cases of which we are aware, the receptacle is retained in upright position with respect to the truck body by latches or holding devices carried by the receptacle and its support. In other instances the receptacle is provided with a lid which may be formed to retain the receptacle in upright position while the lid is closed with respect to the receptacle.

It is one of the objects of the present invention to so construct the receptacle and its mounting with respect to the vehicle body on which it is supported, that it will be unnecessary to employ devices such as locks or latches or the like to retain the receptacle, when loaded, in an upright position with respect to the vehicle body.

It is a further object of our invention to adequately protect materials, such as cement, which may be carried by the receptacles, by preventing access to moisture into the interior of the receptacles, and at the same time to eliminate interference or obstruction to the operation of the receptacle in dumping the material, or to obstruct the loading of the receptacle.

Another object of our invention resides in providing a tilting receptacle for use in connection with dumping trucks, which may be easily discharged of its contents, yet which can be maintained in a non-discharging position, with respect to the truck body, by gravity.

A still further object of the invention consists in simplifying the construction, operation and application of tiltable receptacles of the aforementioned type. By thus simplifying the construction of these devices the cost of manufacture is materially reduced without sacrificing strength or durability.

Other objects and advantages of our invention will become more apparent as the following descriptions of several embodiments thereof progress, reference being made to the accompanying drawings in which like reference characters are employed to designate like parts throughout the same.

In the drawings:—

Figure 4 is a perspective view of a third embodiment of our invention.

Figure 5 is a perspective view of a fourth embodiment of our invention.

Figure 6 is a perspective view of a fifth embodiment of our invention.

Figure 7 is a perspective view of another embodiment of our invention showing the cover or lid in closed position with respect to the receptacle.

Figure 8 is a view similar to Figure 7 showing the receptacle in dumping position and showing the lid or cover retracted from the mouth of the receptacle.

Figure 1:
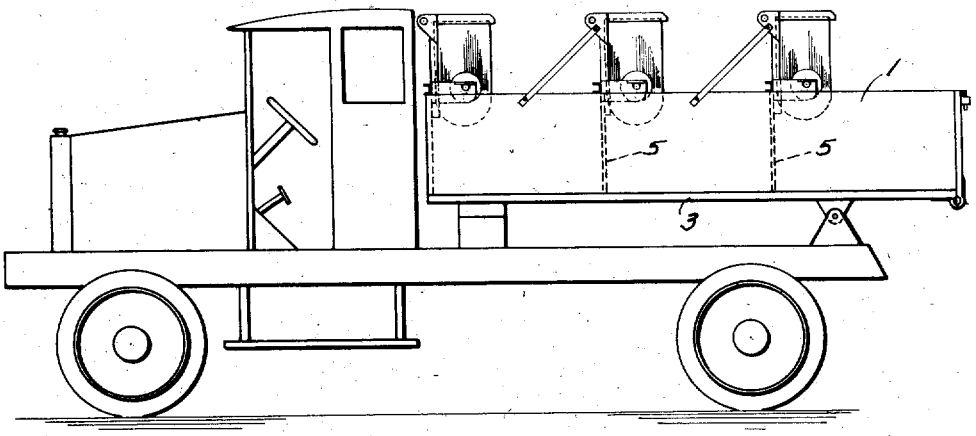
Figure 1 is a side elevation of one embodiment of our invention shown applied in use on a dumping truck.
Figure 2:
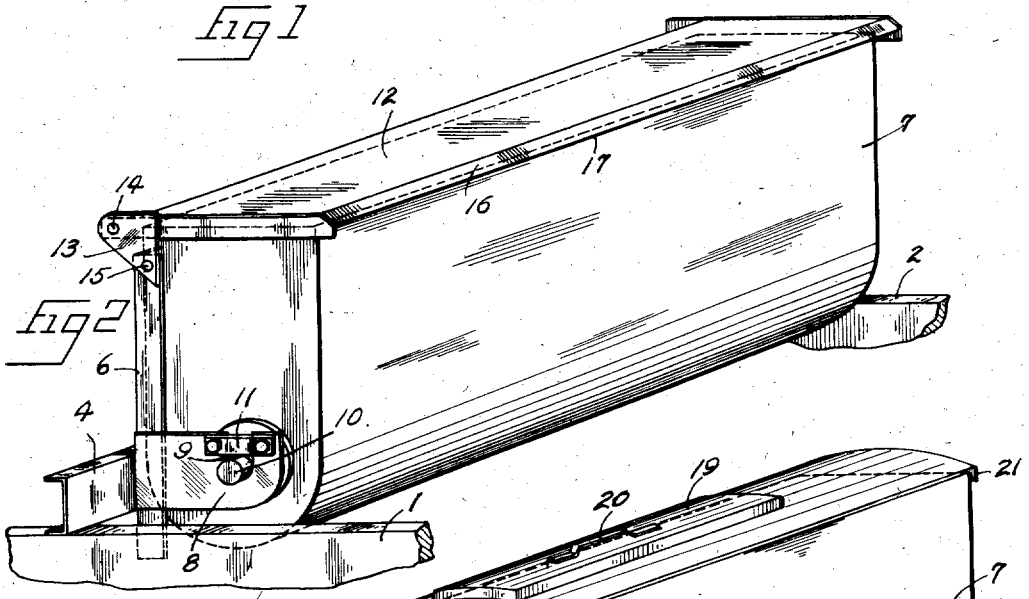
Figure 2 is a perspective view of the device shown in Figure 1.

Referring first more particularly to Figures 1 and 2, in which we have illustrated the first embodiment of our invention, the side walls 1 and 2 of the dumping truck body 3 support the cross bars 4 at suitable intervals and preferably just behind the division gates indicated at 5. The cross bar or supporting member may be in the form of a channel and is adapted to rest on the side walls 1 and 2 and may be secured thereto by means of bolts.

The channel 4 carries upright frame members 6 in spaced relation. These frame members may be adjusted vertically on the channels 4 to any desired height by reason of a series of openings (not shown) through which suitable bolts may pass. The channels 4 are also provided with openings (not shown) arranged lengthwise of the channel and which are adapted to register with the openings in the upright member 6. It will thus be seen that proper vertical adjustment may be easily made to adjust the receptacle or box 7 to the proper height about or within the truck body. Furthermore it will be seen that where boxes of different lengths are used the upright supports 6 may be placed close together or further apart depending upon the length of box to be used between these uprights. Each of the upright frame members 6 carries a horizontally projecting bearing member 8 which is notched at 9 to receive and support the trunnions 10 secured to the ends of the receptacle or box 7. The trunnions 10 may be removably retained in the slots 9 by means of the removable links 11 which are arranged to bridge these slots.

It will be especially noted that the trunnions are so mounted on the end walls of the receptacle 7 that the turning axis of the receptacle is below the center of gravity of the loaded box and that the turning axis is also offset from and extends substantially parallel to the central, vertical longitudinal plane passing through the box or receptacle.

In the illustration it will be seen that the turning axis is offset from this plane to the right in Figure 2. In this manner when the box is loaded and is in upright position, as shown, the box will remain in this position even though the truck body is tilted, because of the offset trunnions and because of the tendency of gravity to tilt the box in a counterclockwise direction in Figure 2.

The box or receptacle 7 is open along the top thereof and is adapted to be covered by a lid or cover 12 pivotally connected to the cover plates 13 at 14. The plates 13 are rigidly secured against movement to the upright member 6 by means of the rivet 15.

The cover is provided along its forward edge with an inclined flange 16 which serves as a water shed or deflecting member 16. The forward edge 17 of the member 16, however, is arranged so that it does not lie in the path of movement of the box 7 when the same is moved to dumping position. When it is desired to charge the receptacle as shown in Figures 1 and 2 the lid 12 is swung about its pivot 14 by the operator whereupon access may be readily had to the interior of the receptacle. It will be noted in this connection that even though the lid is raised, the receptacle will remain in upright position without the use of locking or latching devices, by reason of the offset turning axis.

Figure 3:
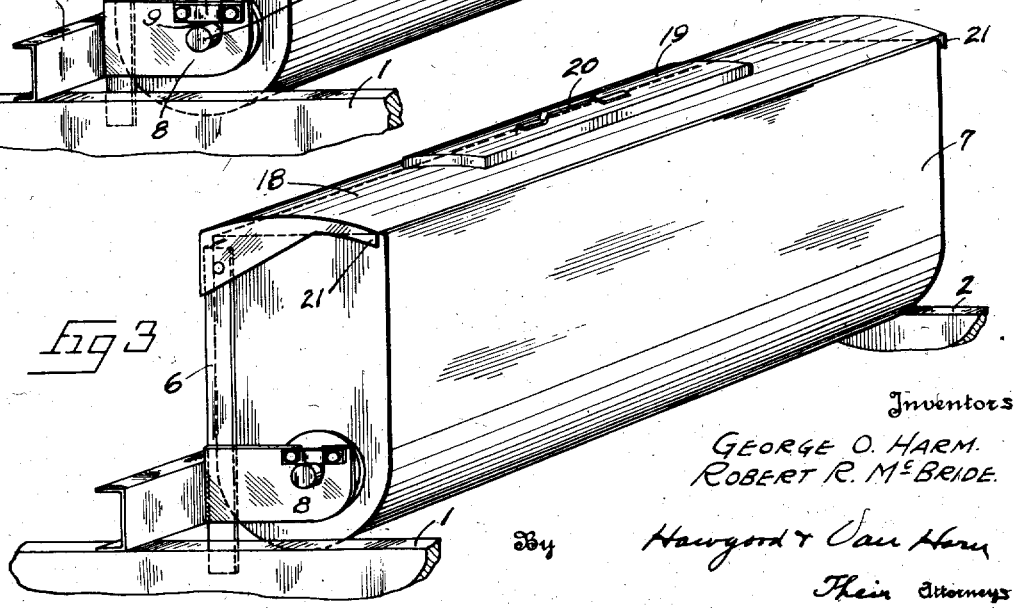
Figure 3 is a perspective view of a second embodiment of our invention.

In Figure 3 we have illustrated another form of our invention which is similar in many respects to that already described, but which differs therefrom in the fact that the cover or lid 18 is fixedly supported by the upright member 6 and is not adapted to be raised as in the former case. When the receptacle 7 is in position for loading such as shown in Figure 3, access may be had to the open top of the receptacle through an opening in the cover 18 which may be closed by a supplemental cover 19 having a handle 20. The cover 19 may be arranged to slide into position to close the opening or may have the conventional peripheral flanges to engage similar flanges formed in the cover 18. It will be noted in connection with this embodiment that although the cover 18 is provided with side flanges 21, there is no forward flange along the forward edge of the cover. In this manner the cover, though fixed, offers no obstruction to the tilting receptacle.

In Figure 4 we have illustrated another embodiment of our invention. In this form, the receptacle 7 is preferably directly supported on the truck body, that is we have eliminated the use of a supporting frame such as used in connection with the embodiment described heretofore. The receptacle 7 is provided with the usual trunnions 10 on opposite sides which are arranged so that the turning axis of the receptacle will lie in a plane offset from the central vertical longitudinal plane of the receptacle. In this respect the present form is similar to those just described. However, in eliminating the receptacle supporting frames, we mount bearings 22 on the side walls 1 and 2 of the truck body, for receiving the opposite trunnions 10.

The receptacle, in the present embodiment, is provided with a cover 23 which is supported in fixed relation to the truck body by means of inverted substantially U shaped frames or brackets 24 carried by the opposite sides 1 and 2 of the truck body. These frames may be formed of angle iron as illustrated, and include the upwardly converging legs 24 bridged at their upper extremities by the arcuate portion 25, to which the cover 23 is secured at its ends. The cover may be secured in place between the portions 25 by welding or by bolts or rivets (not shown), and is provided with an opening therein for charging the receptacle. The charging opening may be covered by a lid or cover 26 having a handle 27.

It will be noted that a flange 28 is formed along the rear longitudinal edge of the cover 23 and extends downwardly into the path of backward movement of the receptacle to provide a stop. In this manner the receptacle may be tilted freely in a clockwise direction to discharge its contents into the truck body, although movement in the opposite direction from the normal vertical position is limited by the stop 28. It will be noted that the tilting movement of the receptacle is not retarded or obstructed by the cover or cover supporting frames, in such manner to interfere with the proper discharge of the material in the receptacle, and that the receptacle is retained in its vertical position by gravity alone. This is due to the relative low turning axis, as defined by the trunnions 10, with respect to the center of gravity of the charged or partially charged receptacle.

In Figure 5, we have illustrated another form of our invention which is similar in most respects to those illustrated in Figures 1, 2 and 3, but which differs therefrom in that the cover for the receptacle 7 comprises the complementary overlapping lids 30 and 31, hingedly supported to the side plates 32 carried by the standards 6. The lid 30 is preferably hinged to the side plates 32 along its rear edge as at 33, its forward edge being formed as at 34 to overlap and house the hinge 35 of the lid 31. In this manner, when the lids are in closed position, as illustrated, they cooperate to provide a complete cover for the mouth or open end of the receptacle 7, there being no danger of moisture passing between the overlapping portions of the lids into the receptacle.

When the lids are lifted to vertical position (not shown) they are disposed in substantially parallel spaced planes and thus provide a guide for filling nozzles. In such use, material may be loaded into the receptacle between the raised lids 30 and 31, the portion of the receptacle opening normally covered by the lid 31 affords a means of escape of the air in the receptacle which is being displaced.

Figure 6 illustrates still another embodiment of our invention in which the lid or cover 36 is slidable across the mouth of the receptacle 7.

The lid 36 is provided with downwardly extending side flanges 37 which overlap the upper side walls of the receptacle 7 when the receptacle is in substantially vertical position. The rear edge of the lid 36 is formed at 38 to carry a supporting rod 39 which extends sufficiently beyond the lid at each end so that the ends of the rod 39 rest on the upper arcuate edges 40 of the side plates 32. The forward end of each side plate 32 terminates in an upwardly extending stop 41 to limit the sliding movement of the lid in one direction to a position which will enable the open end of the receptacle to receive material. The forward end of the lid is supported above the receptacle in spaced relation thereto by means of the links 42 on the opposite sides thereof, the lower ends of the links being pivotally connected with bolts 43 which secure the strap 11 in place.

It will thus be seen by this construction that the operator may slide the lid forwardly and downwardly to expose the open end of the receptacle for filling the same. This may be done by grasping the lid at any point and sliding it to such a position, the entire lid being supported at its forward and rearward portions so that it will be free to contact with any portion of the receptacle 7, thereby not obstructing the desired automatic tilting of the receptacle when the truck body is tilted.

Referring now more particularly to Figures 7 and 8 we have illustrated another embodiment of our invention which is highly desirable in use, and in which the lid carried by the receptacle may be automatically moved to a point to permit the discharge of material in the receptacle when the latter is tilted for the purpose of discharging such material. Furthermore by this embodiment the lid may be manually moved to a point to permit charging of the receptacle when the receptacle is in a substantially vertical position.

In this form of our invention the receptacle 7 is supported on the sides 1 and 2 of the truck body by means of the trunnions 10 as has been heretofore described. In the present instance, however, we provide a sleeve 45 which is fixed with respect to one of the bearing members 22 and which receives the corresponding trunnion 10 to permit oscillation of the latter therein.

We have provided means for automatically removing the lid 46 from the path of discharge of the material in the receptacle when the receptacle is tilted to a position for dumping its contents. This means includes preferably a segment 47 keyed to the sleeve 45. The operating surface of the segment 47 is preferably grooved as at 48 to provide a seat or track for the cable 49 which is anchored at one end of the segment and at its other end to the lid 46. The lid is pivotally carried at each end by the receptacle as indicated at 50, and is preferably arcuate in cross section to permit the same to be swung to a position whereby the lid will not interfere with discharge of the material from within the receptacle. Suitable handles 51 may be provided on the lid to manually remove the same from the mouth of the receptacle to permit the charging of the latter with material.

We have provided means in connection with this embodiment of our invention to limit the tilting of the receptacle in one direction. This means includes an arm 52 which may be in the form of a casting keyed at 53 to an extension of one of the trunnions 10. A stop 54 may be bolted or otherwise secured to one of the side walls of the truck body in the path of movement of the arm 52 to prevent reverse dumping of the receptacle.

It will therefore be seen by referring to Figures 1 to 8 inclusive that we have materially simplified the construction and operation of dumping receptacles, especially those of the type which are employed with dumping truck bodies, and which are adapted to carry a separate charge of cement and to dump the charge into a corresponding compartment of the truck body carrying other aggregates such as sand or gravel.

It will also be seen that we have provided a dumping receptacle which is so constructed and supported on a tilting body that it will remain in substantially upright position for receiving or carrying a charge of material without danger of prematurely dumping its charge, and without the necessity of employing holding or fastening devices. As a matter of fact, even though the receptacle is loaded it may be readily dumped manually even though the truck body on which it is supported is in a substantially horizontal position.

Various changes in the details of construction and arrangement of parts may be made without departing from the spirit of our invention or the scope of the appended claims.

We claim:

1. The combination with a dumping truck body, of a tilting charging receptacle having an open top, said receptacle being pivotally mounted below its center of gravity on said body whereby the receptacle may be dumped upon tilting of the truck body out of its normal position, the turning axis of the receptacle being offset from the central longitudinal plane of the receptacle, a cover carried by the receptacle to close its open top, and means supported on the body for automatically removing the cover from the open top of the receptacle when the latter is moved to dumping position.

2. The combination with a dumping truck body, of a tilting charging receptacle having an open top, said receptacle being pivotally mounted below its center of gravity on said body whereby the receptacle may be dumped upon tilting of the truck body out of its normal position, the turning axis of the receptacle being offset from the central longitudinal plane of the receptacle, a cover carried by the receptacle to close its open top, and means for automatically removing the cover from the open top of the receptacle when the latter is moved to dumping position, said cover being pivotally carried by the receptacle, said means including a member carried by the body and movable relative to the receptacle and a flexible member connecting the member and cover.

3. The combination with a dumping truck body, of a tilting charging receptacle having an open top, said receptacle being pivotally mounted below its center of gravity on said body whereby the receptacle may be dumped upon tilting of the truck body out of its normal position, the turning axis of the receptacle being offset from the central longitudinal plane of the receptacle, a cover carried by the receptacle to close its open top, and means for automatically removing the cover from the open top of the receptacle when the latter is moved to dumping position, said cover being pivotally carried by the receptacle, said means including a segment carried by the body and movable relative to the receptacle, and a flexible member connecting the segment and cover, said segment having a groove to receive the flexible member and guide the same during the dumping of the receptacle.

4. The combination with a dumping truck body, of a tilting charging receptacle having an open top, said receptacle being pivotally mounted below its center of gravity on said body whereby the receptacle may be dumped upon tilting of the truck body out of its normal position, the turning axis of the receptacle being offset from the central longitudinal plane of the receptacle, a cover carried by the receptacle to close its open top, and means for automatically removing the cover from the open top of the receptacle when the latter is moved to dumping position, said cover being pivotally carried by the receptacle, said means including a segment carried by and movable relative to the receptacle, and a flexible member connecting the segment and cover, an arm movable with the receptacle, and a stop on the truck body in the path of movement of the arm to prevent backward tilting of the receptacle from a substantially vertical position.

5. The combination with a dumping truck body, of a tilting charging receptacle having an open top, said receptacle being pivotally mounted below its center of gravity on said body whereby the receptacle may be dumped upon tilting of the truck body out of its normal position, the turning axis of the receptacle being offset from the central longitudinal plane of the receptacle, a cover carried by the receptacle to close its open top, and means supported by the body and having connection with the cover for automatically removing the cover from its closed position on the open top of the receptacle when the receptacle is moved to dumping position.

6. The combination with a dumping truck body, of a tilting charging receptacle having an open top, said receptacle being pivotally mounted on said truck body whereby the receptacle may be dumped upon tilting of the truck body out of its normal position, a cover carried by the receptacle to close its open top, and means supported by the body and having connection with the cover for automatically removing the cover from its closed position on the open top of the receptacle when the receptacle is moved to dumping position.

7. The combination with a dumping truck body, of a tilting charging receptacle having on open top, said receptacle being pivotally mounted below its center of gravity on said body whereby the receptacle may be dumped upon tilting of the truck body out of its normal position, a cover carried by the receptacle to close its open top, and means supported on the body for automatically removing the cover from the open top of the receptacle when the latter is moved to dumping position.

8. The combination with a dumping truck body, of a tilting charging receptacle having an open top, said receptacle being pivotally mounted below its center of gravity on said body whereby the receptacle may be dumped upon tilting of the truck body out of its normal position, a cover carried by the receptacle to close its open top, and means for automatically removing the cover from the open top of the receptacle when the latter is moved to dumping position, said cover being pivotally carried by the receptacle, said means including a member carried by the body and movable relative to the receptacle, and a flexible member connecting the member and cover.

9. The combination with a dumping truck body, of a tilting charging receptacle having an open top, supported on the body pivotally mounted below its center of gravity on said body whereby the receptacle may be dumped upon tilting of the truck body out of its normal position, a cover carried by the receptacle to close its open top, and means for automatically removing the cover from the open top of the receptacle when the latter is moved to dumping position, said cover being pivotally carried by the receptacle, said means including a segment carried by the body and movable relative to the receptacle, and a flexible member connecting the segment and cover, said segment having a groove to receive the flexible member and guide the same during the dumping of the receptacle.

10. The combination with a dumping truck body, of a tilting charging receptacle having an open top, said receptacle being pivotally mounted below its center of gravity on said body whereby the receptacle may be dumped upon tilting of the truck body out of its normal position, a cover carried by the receptacle to close its open top, and means for automatically removing the cover from the open top of the receptacle when the latter is moved to dumping position, said cover being pivotally carried by the receptacle, said means including a segment carried by the body and movable relative to the receptacle, and a flexible member connecting the segment and cover, an arm movable with the receptacle, and a stop on the truck body in the path of movement of the arm to prevent backward tilting of the receptacle from a substantially vertical position.

11. Apparatus for handling material, comprising a body having an assembling compartment, a batch box pivotally mounted on said body, said box being adapted to invert to discharge its contents into the assembling compartment when the body is tilted, a cover hinged to the box, and flexible means connected to the cover and to the body for restraining the cover from falling down when the box is inverted and the cover is opened.

12. Apparatus for handling material, comprising a tiltable body having an assembling compartment, a batch box pivotally mounted in bearings secured to said body, said box being adapted to invert to discharge its contents into the compartment when the body is tilted, a hinged cover for the box, and a cable secured to the cover and to said bearing for restraining the cover from falling down when the box is inverted.

13. The combination with a dumping truck body, of a tilting charging receptacle having an open top, said receptacle being pivotally mounted on said truck body whereby the receptacle may be dumped upon tilting of the truck body out of its normal position, a cover carried by the receptacle to close its open top, and means supported by the body and having connection with the cover for removing the cover from its closed position on the open top of the receptacle when the receptacle is moved to dumping position.

14. The combination with a dumping truck body, of a tilting charging receptacle having an open top, said receptacle being pivotally mounted below its center of gravity on said body whereby the receptacle may be dumped upon tilting of the truck body out of its normal position, a cover carried by the receptacle to close its open top, and means supported on the body for removing and holding the cover removed from the open top of the receptacle when the latter is moved to dumping position.

GEORGE O. HARM.
ROBERT R. McBRIDE.